(12) United States Patent
Lee

(10) Patent No.: US 12,658,690 B2
(45) Date of Patent: Jun. 16, 2026

(54) MOVABLE DISTRIBUTION BOARD HAVING LEAKAGE CURRENT LIMITING FUNCTION

(71) Applicant: VISION TECH Corporation, Busan (KR)

(72) Inventor: Ho Seok Lee, Busan (KR)

(73) Assignee: VISION TECH Corporation, Busan (KR)

( * ) Notice: Subject to any disclaimer, the term of this patent is extended or adjusted under 35 U.S.C. 154(b) by 116 days.

(21) Appl. No.: 18/224,526

(22) Filed: Jul. 20, 2023

(65) Prior Publication Data

US 2024/0291269 A1 Aug. 29, 2024

(30) Foreign Application Priority Data

Feb. 27, 2023 (KR) ........................ 10-2023-0025887

(51) Int. Cl.
| | |
|---|---|
| *H02H 9/02* | (2006.01) |
| *H01R 9/24* | (2006.01) |
| *H01R 13/02* | (2006.01) |
| *H01R 13/10* | (2006.01) |
| *H02B 1/015* | (2006.01) |
| *H02B 1/52* | (2006.01) |

(52) U.S. Cl.
CPC ................. *H02H 9/02* (2013.01); *H01R 9/24* (2013.01); *H01R 13/02* (2013.01); *H01R 13/10* (2013.01); *H02B 1/015* (2013.01); *H02B 1/52* (2013.01)

(58) Field of Classification Search
CPC ............................. H02B 1/52; H02B 1/00–565
See application file for complete search history.

(56) References Cited

U.S. PATENT DOCUMENTS

| | | | | |
|---|---|---|---|---|
| 9,960,519 | B2 | 5/2018 | Lee | |
| 11,489,334 | B2 | 11/2022 | Lee | |
| 2015/0357742 | A1* | 12/2015 | Lee | H01R 13/648 |
| | | | | 307/326 |
| 2021/0328390 | A1* | 10/2021 | Hansen | H01R 13/73 |
| 2021/0408785 | A1* | 12/2021 | Lee | H01H 71/08 |
| 2023/0299513 | A1 | 9/2023 | Lee | |

FOREIGN PATENT DOCUMENTS

| | | |
|---|---|---|
| KR | 10-1513265 B1 | 4/2015 |
| KR | 10-1615144 B1 | 4/2016 |
| KR | 10-1625493 B1 | 5/2016 |

(Continued)

OTHER PUBLICATIONS

Translation of WO 2021261673A1. Dec. 30, 2021. (Year: 2021).*

(Continued)

*Primary Examiner* — Thienvu V Tran
*Assistant Examiner* — Christopher J Clark

(57) ABSTRACT

The present disclosure relates to a movable distribution board having a leakage current limiting function, in which the movable distribution board is implemented in a mobile manner so that the movable distribution board may be used in various places, the circuit breaker, the terminal block, and the electrical outlet having a leakage current limiting function are provided therein to limit a current leaking from the distribution board when the movable distribution board is used in the field, and thus, the risk of electric shock to the human body due to the leakage current can be minimized.

4 Claims, 5 Drawing Sheets

(56)         References Cited

FOREIGN PATENT DOCUMENTS

| | | | |
|---|---|---|---|
| KR | 10-1984479 B1 | 5/2019 | |
| KR | 10-2022-0000630 A | 1/2022 | |
| KR | 10-2022-0000631 A | 1/2022 | |
| WO | WO-2021261673 A1 * | 12/2021 | .............. H01R 9/24 |

OTHER PUBLICATIONS

Surface (topology). Wikipedia. <https://en.wikipedia.org/wiki/
Surface_(topology)#:~:text=A%20closed%20surface%20is%20a,)%
2C%20and%20the%20M%C3%B6bius%20strip.>. Accessed Aug.
3, 2025. (Year: 2025).*
Non-final Office Action dated Jun. 24, 2024 from the Korean Patent
Office for Application No. 10-2023-0025887.
Final Office Action dated Feb. 24, 2025 from the Korean Patent
Office for Application No. 10-2023-0025887.
Notice of Allowance mailed on Oct. 29, 2025 from Korean Patent
Office for Application No. 10-2023-0025887.

* cited by examiner

151a

151

151b

153

154

155

156

152

150

MOVABLE DISTRIBUTION BOARD HAVING LEAKAGE CURRENT LIMITING FUNCTION

CROSS-REFERENCE TO RELATED APPLICATION

This application claims priority to and the benefit of Korean Patent Application No. 10-2023-0025887 filed on Feb. 27, 2023, the disclosure of which is incorporated herein by reference in its entirety.

BACKGROUND

1. Field of the Invention

The present disclosure relates to a distribution board, and more particularly, to a movable distribution board having a leakage current limiting function.

2. Discussion of Related Art

Korean Patent Registration No. 10-1625493 (published on May 30, 2016) previously filed and registered by the applicant of the present disclosure discloses that a leakage current decreases as an area ratio difference between two flat conductors increases. This technology prevents electric shock by limiting the leakage current by using an area difference between conductor electrodes.

The present inventor has studied a technology capable of limiting a current leaking from a distribution board when used in the field because the distribution board is implemented in a mobile manner so that the distribution board may be used in various places and a circuit breaker, a terminal block, and an electrical outlet having a leakage current limiting function are provided therein.

RELATED ART DOCUMENT

Patent Document

Korean Patent Registration No. 10-1625493 (published on May 30, 2016)

SUMMARY OF THE INVENTION

The present disclosure is directed to providing a movable distribution board having a leakage current limiting function, in which the movable distribution board is implemented in a mobile manner so that the movable distribution board may be used in various places, a circuit breaker, a terminal block, and an electrical outlet having a leakage current limiting function are provided therein, and thus a current leaking from the distribution board may be limited when the movable distribution board is used in the field.

A movable distribution board having a leakage current limiting function includes a movable enclosure, an inner body made of an insulating material, which is mounted inside the movable enclosure, and circuit breakers having a leakage current limiting function, which are fixedly arranged in a specific area of the inner body and block power distributed from a power line to terminal loads, wherein the circuit breaker having a leakage current limiting function includes a neutral line input terminal area expansion unit that is in electrical contact with a neutral line input terminal on an input side of the circuit breaker to expand an area of the neutral line input terminal on the input side of the circuit breaker so as to limit a leakage current on the input side of the circuit breaker, and a neutral line output terminal area expansion unit that is in electrical contact with a neutral line output terminal on an output side of the circuit breaker to expand an area of the neutral line output terminal on the output side of the circuit breaker so as to limit a leakage current on the output side of the circuit breaker.

The movable distribution board may further include terminal blocks having a leakage current limiting function, which are fixedly arranged in a specific area of the inner body and distribute the power distributed from the power line to the terminal loads, wherein the terminal block may include an insulator terminal block body in which a phase voltage line conductor electrode having both ends respectively connected to an input side phase voltage line (R line or T line or S line) and an output side phase voltage line (R line or T line or S line), a neutral line conductor electrode having both ends respectively connected to an input side neutral line (N line) and an output side neutral line (N line), and a ground line conductor electrode having both ends respectively connected to an input side ground line (G line) and an output side ground line (G line) are mounted, an insulator outer enclosure coupled to surround the insulator terminal block body at upper and lower portions thereof, and a neutral line conductor electrode area expansion unit that is in electrical contact with the neutral line conductor electrode of the insulator terminal block body to expand an area of the neutral line conductor electrode so as to limit a leakage current.

The movable distribution board may further include electrical outlets having a leakage current limiting function, which are fixedly arranged in a specific area of the inner body, into which a plug of an electronic device is inserted and coupled, which supply the power distributed from the power line to the electronic device through the plug, wherein the electrical outlet may include a phase voltage line terminal to which a phase voltage line (R line or T line or S line) of the power line is connected, a neutral line terminal to which a neutral line (N line) of the power line is connected, a ground terminal to which a ground line (G line), and a neutral line terminal area expansion unit that is in electrical contact with the neutral line terminal to expand an area of the neutral line terminal so as to limit a leakage current.

The movable distribution board may further include a door coupled to the front of the movable enclosure to be opened or closed.

The movable distribution board may further include a support leg coupled to a lower portion of the movable enclosure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
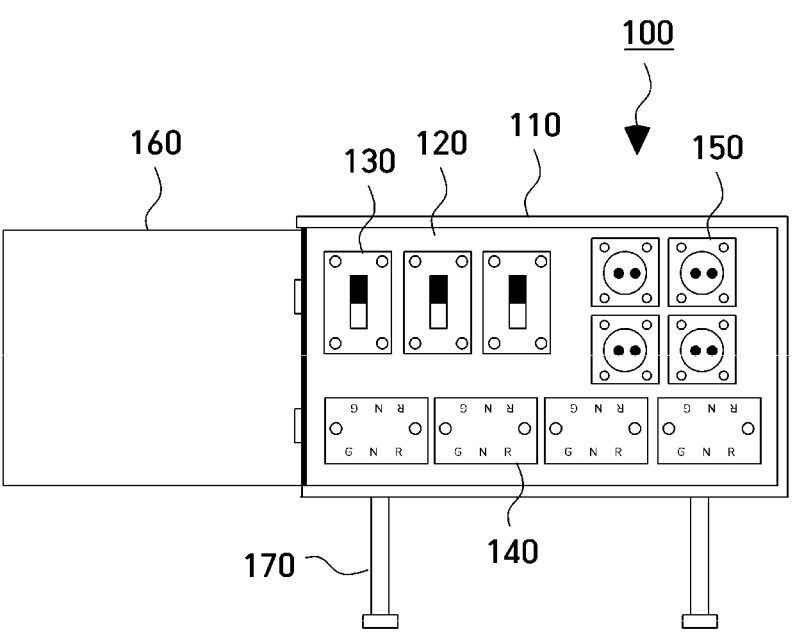
FIG. 1 is a view illustrating an exterior of a configuration of a movable distribution board having a leakage current limiting function according to an embodiment of the present disclosure.

Hereinafter, the present disclosure will be described in detail so that those skilled in the art may easily understand and reproduce the present disclosure through exemplary embodiments described with reference to the accompanying drawings. Although specific embodiments are illustrated in the drawings and related detailed descriptions are made, the embodiments and descriptions are not intended to limit various embodiments of the present disclosure to any particular form.

In the description of the present disclosure, when it is determined that the detailed description of related widely known functions or configurations may make the subject matter of the embodiments of the present disclosure unclear, the detailed description will be omitted.

It should be understood that, when it is mentioned that a first component is "connected" or "coupled" to a second component, the first component may be directly connected or coupled to the second component, or a third component may be present between the first component and the second component.

On the other hand, it should be understood that, when a first component is "directly connected" or "directly coupled" to a second component, a third component is not present therebetween.

FIG. 1 is a view illustrating an exterior of a configuration of a movable distribution board having a leakage current limiting function according to an embodiment of the present disclosure. As illustrated in FIG. 1, a movable distribution board 100 having a leakage current limiting function according to the embodiment includes a movable enclosure 110, an inner body 120 made of an insulating material, and circuit breakers 130.

The movable enclosure 110 is made of an insulating material and is fixedly mounted so that the inner body 120 made of an insulating material cannot move therein. Meanwhile, a handle (not illustrated) may be installed on an outer upper surface or both side surfaces of the movable enclosure 110 so that a user may lift and move the movable enclosure 110 by hand.

The inner body 120 made of an insulating material is mounted inside the movable enclosure 110, and the circuit breakers 130 having a leakage current limiting function are fixedly arranged in the specific area of the inner body 120 made of an insulating material. For example, the circuit breakers 130 may be screw-coupled to the inner body 120 made of an insulating material while inserted into a circuit breaker groove (not illustrated) formed in the inner body 120 made of an insulating material.

Figure 2:
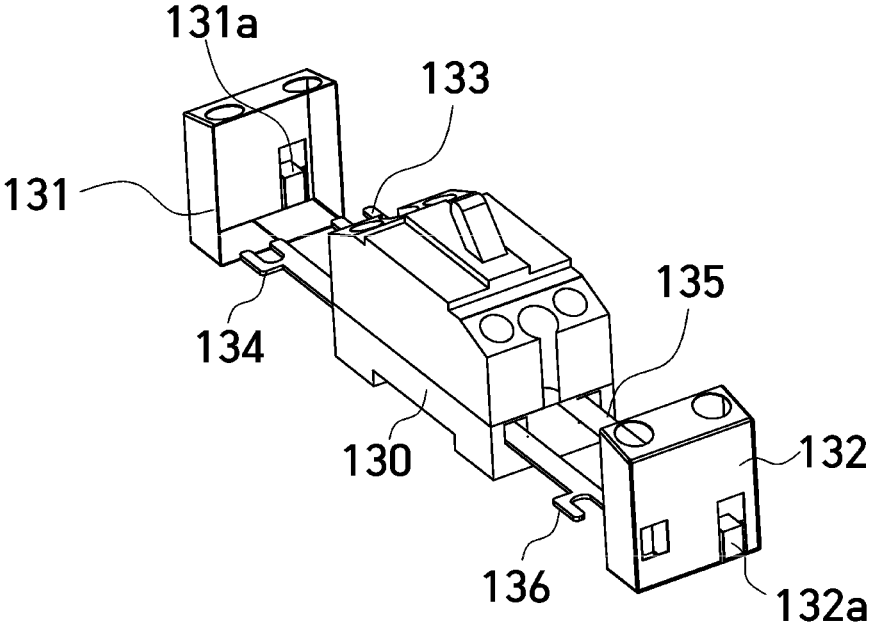
FIG. 2 is a perspective view illustrating a configuration of a circuit breaker of the movable distribution board having a leakage current limiting function according to the embodiment of the present disclosure.

The circuit breakers 130 are fixedly arranged in the specific area of the inner body 120 to block power distributed from power lines (not illustrated) to terminal loads (not illustrated), and have a leakage current limiting function as illustrated in FIG. 2.

FIG. 2 is a perspective view illustrating a configuration of a circuit breaker of the movable distribution board having a leakage current limiting function according to the embodiment of the present disclosure. As illustrated in FIG. 2, the circuit breaker 130 having a leakage current limiting function according to the embodiment includes a neutral line input terminal area expansion unit 131 made of a conductive material and a neutral line output terminal area expansion unit 132 made of a conductive material.

The neutral line input terminal area expansion unit 131 made of a conductive material is in electrical contact with a neutral line input terminal 133 on an input side of the circuit breaker 130 to expand an area of the neutral line input terminal 133 on the input side of the circuit breaker 130 so as to limit a leakage current on the input side of the circuit breaker 130.

For example, since a connection part 131*a* formed at a specific portion of the neutral line input terminal area expansion unit 131 is designed to be in mechanical contact with the neutral line input terminal 133 on the input side of the circuit breaker 130 and the neutral line input terminal area expansion unit 131 is in electrical contact with the neutral line input terminal 133 on the input side of the circuit breaker 130, the area of the neutral line input terminal 133 may be expanded.

The area of the neutral line input terminal 133 on the input side of the circuit breaker 130 becomes greater than a phase voltage line input terminal 134 due to the neutral line input terminal area expansion unit 131 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line input terminal of the present disclosure) connected to a negative terminal becomes greater than an area of the flat plate-shaped conductor (corresponding to the phase voltage line input terminal of the present disclosure) connected to a positive terminal of a power source.

In detail, a closed loop is not normally configured in a portion where an area is expanded by the neutral line input terminal area expansion unit 131, but when the circuit breaker 130 of the movable distribution board 100 having a leakage current limiting function is submerged in water due to flooding, the closed loop is configured.

When the circuit breaker 130 of the movable distribution board 100 having a leakage current limiting function is submerged in water and thus the closed loop is configured, a current leaks through the phase voltage line input terminal 134 on the input side of the circuit breaker 130, and the current flows through the phase voltage line input terminal 134 on the input side of the circuit breaker 130, the water, the neutral line input terminal area expansion unit 131, and the neutral line input terminal 133 on the input side of the circuit breaker 130 in this order.

In this process, the current leaking through the phase voltage line input terminal 134 on the input side of the circuit breaker 130 does not flow to the human body having a relatively very large resistance but flows to the neutral line input terminal area expansion unit 131 through the water and is drawn into the neutral line input terminal 133 on the input side of the circuit breaker 130. Thus, the flow of the leakage current to the human body is limited, and thus the risk of electric shock to the human body is minimized.

The neutral line output terminal area expansion unit 132 made of a conductive material is in electrical contact with a neutral line output terminal 135 on an output side of the circuit breaker 130 to expand an area of the neutral line output terminal 135 on the output side of the circuit breaker 130 so as to limit a leakage current on the output side of the circuit breaker 130.

For example, since a connection part 132a formed at a specific portion of the neutral line output terminal area expansion unit 132 is designed to be in mechanical contact with the neutral line output terminal 135 on the output side of the circuit breaker 130 and the neutral line output terminal area expansion unit 132 is in electrical contact with the neutral line output terminal 135 on the output side of the circuit breaker 130, the area of the neutral line output terminal 135 may be expanded.

The area of the neutral line output terminal 135 on the output side of the circuit breaker 130 becomes greater than a phase voltage line output terminal 136 due to the neutral line output terminal area expansion unit 132 made of a conductive material, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line output terminal of the present disclosure) connected to a negative terminal becomes greater than an area of the flat plate-shaped conductor (corresponding to the phase voltage line output terminal of the present disclosure) connected to a positive terminal of a power source.

In detail, a closed loop is not normally configured in a portion where an area is expanded by the neutral line output terminal area expansion unit 132, but when the circuit breaker 130 of the movable distribution board 100 having a leakage current limiting function is submerged in water due to flooding, the closed loop is configured.

When the circuit breaker 130 of the movable distribution board 100 having a leakage current limiting function is submerged in water and thus the closed loop is configured, the current leaks through the phase voltage line output terminal 136 on the output side of the circuit breaker 130, and the current flows through the phase voltage line output terminal 136 on the output side of the circuit breaker 130, the water, the neutral line output terminal area expansion unit 132, and the neutral line output terminal 135 on the output side of the circuit breaker 130 in this order.

In this process, the current leaking through the phase voltage line output terminal 136 on the output side of the circuit breaker 130 does not flow to the human body having a relatively very large resistance but flows to the neutral line output terminal area expansion unit 132 through the water and is drawn into the neutral line output terminal 135 on the output side of the circuit breaker 130. Thus, the flow of the leakage current to the human body is limited, and thus the risk of electric shock to the human body is minimized.

By this implementation, according to the present disclosure, the movable distribution board is implemented in a mobile manner so that the movable distribution board may be used in various places, the circuit breaker having a leakage current limiting function is provided therein, and thus when the movable distribution board is used in the field, the current leaking from the distribution board may be limited. Accordingly, the risk of electric shock to the human body due to the leakage current can be minimized.

Meanwhile, according to an additional aspect of the present disclosure, the movable distribution board 100 having a leakage current limiting function may further include terminal blocks 140. The terminal blocks 140 are fixedly arranged in a specific area of the inner body 120, distribute power distributed from a power line to terminal loads, and have a leakage current limiting function.

Figure 3:
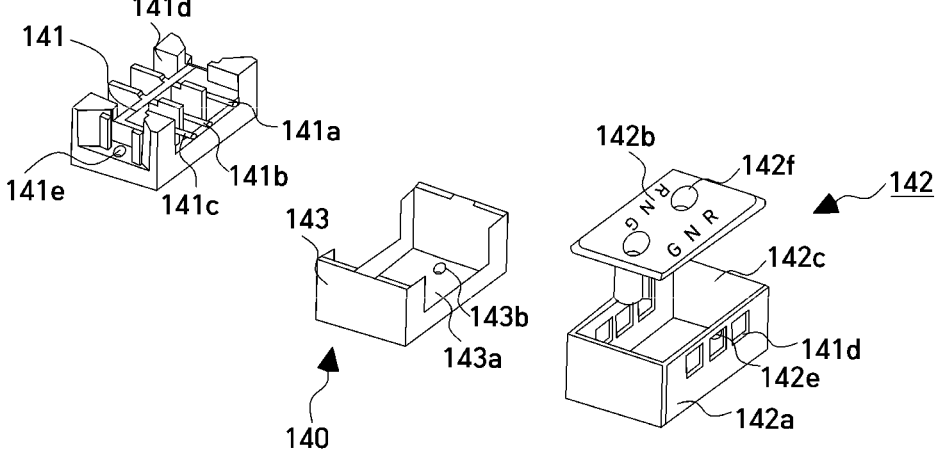
FIG. 3 is a perspective view illustrating a configuration of a terminal block of the movable distribution board having a leakage current limiting function according to the embodiment of the present disclosure.

FIG. 3 is a perspective view illustrating a configuration of a terminal block of the movable distribution board having a leakage current limiting function according to the embodiment of the present disclosure. As illustrated in FIG. 3, the terminal block 140 according to the embodiment includes an insulator terminal block body 141, an insulator outer enclosure 142, and a neutral line conductor electrode area expansion unit 143.

The insulator terminal block body 141 is equipped with a phase voltage line conductor electrode 141a having both ends respectively connected to an input side phase voltage line (R line or T line or S line) (not illustrated) and an output side phase voltage line (R line or T line or S line) (not illustrated), a neutral line conductor electrode 141b having both ends respectively connected to an input side neutral line (N line) (not illustrated) and an output side neutral line (N line) (not illustrated), and a ground line conductor electrode 141c having both ends respectively connected to an input side ground line (G line) (not illustrated) and an output side ground line (G line) (not illustrated).

The insulator outer enclosure 142 is coupled to surround the insulator terminal block body 141 at upper and lower portions thereof. For example, the insulator outer enclosure 142 may include an insulator outer enclosure base body 142a in which the insulator terminal block body 141 is accommodated and an insulator outer enclosure lid 142b screw-coupled (not illustrated) to an upper portion of the insulator outer enclosure base body 142a in a state in which the insulator terminal block body 141 is accommodated therein.

The neutral line conductor electrode area expansion unit 143 is in electrical contact with the neutral line conductor electrode 141b of the insulator terminal block body 141 to expand an area of the neutral line conductor electrode 141b so as to limit the leakage current. In FIG. 3, non-described reference numeral 141d denotes an electrode accommodation groove, non-described reference numerals 141e, 142e, 142f, and 143b denote screw coupling grooves, non-described reference numerals 142c and 143a denote accommodation grooves, and non-described reference numeral 142d denotes a tubular groove.

The area of the neutral line conductor electrode 141b of the insulator terminal block body 141 becomes greater than the phase voltage line conductor electrode 141a due to the neutral line conductor electrode area expansion unit 143, and thus the leakage current becomes much smaller. Further, as the leakage current becomes smaller, the risk of electric shock becomes smaller, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line conductor electrode of the present disclosure) connected to a negative terminal becomes greater than an area of the flat plate-shaped conductor (corresponding to the phase voltage line conductor electrode of the present disclosure) connected to a positive terminal of a power source.

In detail, a closed loop is not normally configured in a portion where an area is expanded by the neutral line conductor electrode area expansion unit 143, but when the terminal block 140 of the movable distribution board 100 having a leakage current limiting function is submerged in water due to flooding, the closed loop is configured.

When the terminal block 140 of the movable distribution board 100 having a leakage current limiting function is submerged in water and the closed loop is configured, the current leaks through the phase voltage line conductor electrode 141a, and the current flows through the phase voltage line conductor electrode 141a, the water, the neutral line conductor electrode area expansion unit 143, and the neutral line conductor electrode 141b in this order.

In this process, the current leaking through the phase voltage line conductor electrode 141a does not flow to the human body having a relatively very high resistance but flows to the neutral line conductor electrode area expansion unit 143 through the water and is drawn in the neutral line conductor electrode 141b. Thus, the leakage current is prevented from flowing to the human body to minimize the risk of electric shock to the human body.

By this implementation, according to the present disclosure, the movable distribution board is implemented in a mobile manner so that the movable distribution board may be used in various places, the terminal block having a leakage current limiting function is provided therein, and thus when the movable distribution board is used in the field, the current leaking from the distribution board may be limited. Accordingly, the risk of electric shock to the human body due to the leakage current can be minimized.

Meanwhile, according to an additional aspect of the present disclosure, the movable distribution board 100 having a leakage current limiting function may further include electrical outlets 150. The electrical outlets 150 are fixedly arranged in the specific area of the inner body 120, a plug (not illustrated) of an electronic device is inserted into and coupled to the electrical outlets 150, and the electrical outlets 150 supply power distributed from a power line to the electronic device through the plug and have a leakage current limiting function.

Figure 4:
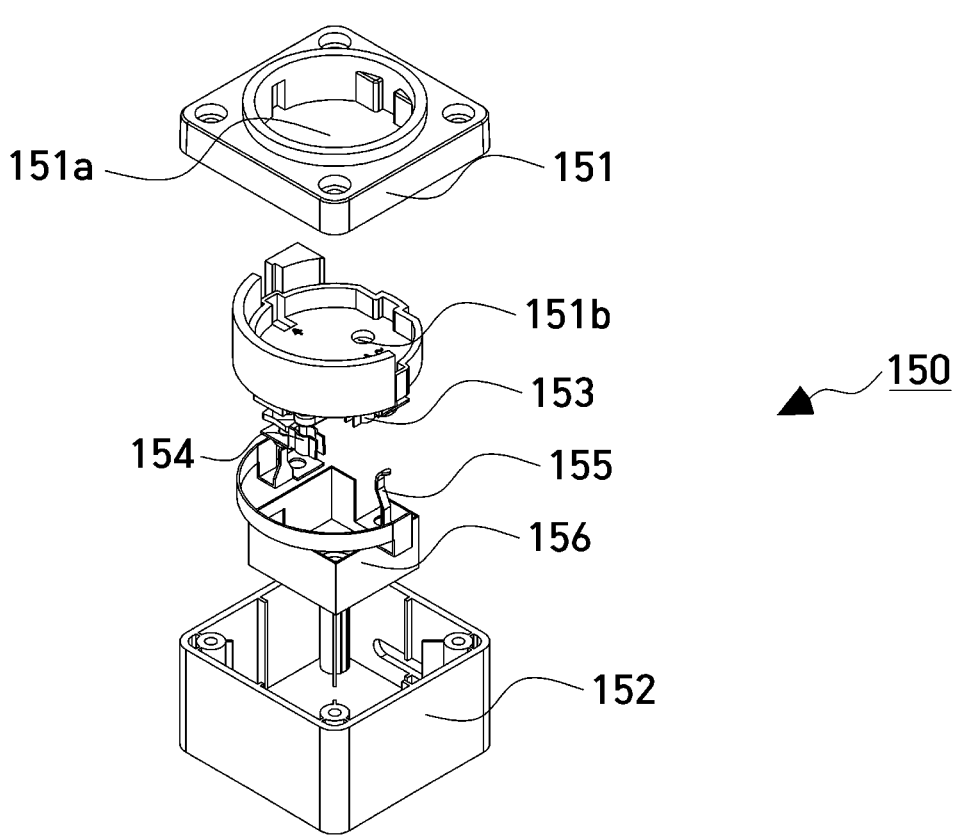
FIG. 4 is an exploded perspective view illustrating a configuration of an electrical outlet of the movable distribution board having a leakage current limiting function according to the embodiment of the present disclosure.

FIG. 4 is an exploded perspective view illustrating a configuration of an electrical outlet of the movable distribution board having a leakage current limiting function according to the embodiment of the present disclosure. As illustrated in FIGS. 4, in the electrical outlet 150 according to the embodiment, a phase voltage line terminal 153, a neutral line terminal 154, a ground terminal 155, and a neutral line terminal area expansion unit 156 that are made of a conductive material are mounted inside a front housing 151 and a rear housing 152 coupled to each other to protect an inside and made of an insulating material.

A plug coupling groove 151a into which a plug of the electronic device is inserted and coupled is formed in the front of the front housing 151, and a plurality of plug pin insertion holes 151b into which a phase voltage line plug pin (not illustrated) and a neutral line plug pin (not illustrated) protruding from an end of the plug to the front are inserted are formed in a bottom surface of the plug coupling groove 151a.

Meanwhile, a plug coupling guide part 151c that guides plug coupling so that the phase voltage line plug pin and the neutral line plug pin are easily inserted into the plug pin insertion holes 151b is formed in an inner circumference of the plug coupling groove 151a, and thus the plug is coupled to the plug coupling groove 151a only in a specific rotational direction.

In a state in which the phase voltage line terminal 153, the neutral line terminal 154, the ground terminal 155, and the neutral line terminal area expansion unit 156 that are made of a conductive material are mounted inside the rear housing 152, the front housing 151 is coupled to the front of the rear housing 152.

The phase voltage line terminal 153 made of a conductive material is connected to a phase voltage line (R line or T line or S line) of the power line. The phase voltage line plug pin protruding from the end of the plug of the electronic device to the front is connected to the phase voltage line terminal 153.

The neutral line terminal 154 made of a conductive material is connected to a neutral line (N line) of the power line. The neutral line plug pin protruding from the end of the plug of the electronic device to the front is connected to the neutral line terminal 154.

The ground terminal 155 made of a conductive material is connected to a ground line (G line). The ground terminal 150 is connected to ground pins (not illustrated) formed on both sides of the end of the plug of the electronic device.

Figure 5:
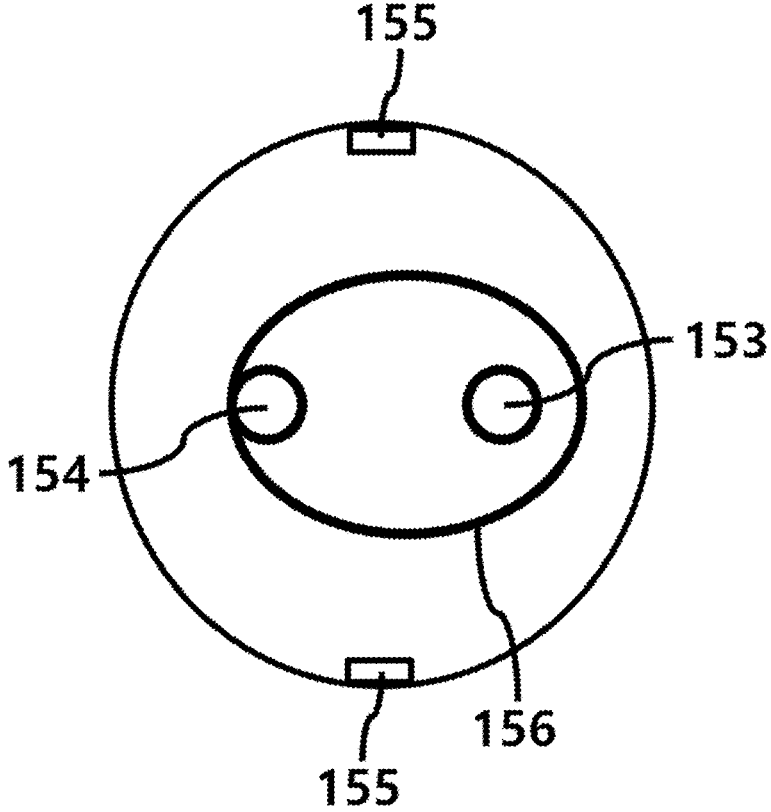
FIG. 5 is a view illustrating an example configuration of a neutral line terminal area expansion unit implemented in the form of a metal body having an eccentric closed surface, which is inscribed with the neutral line terminal and spaced apart from the phase voltage line terminal.
Figure 6:
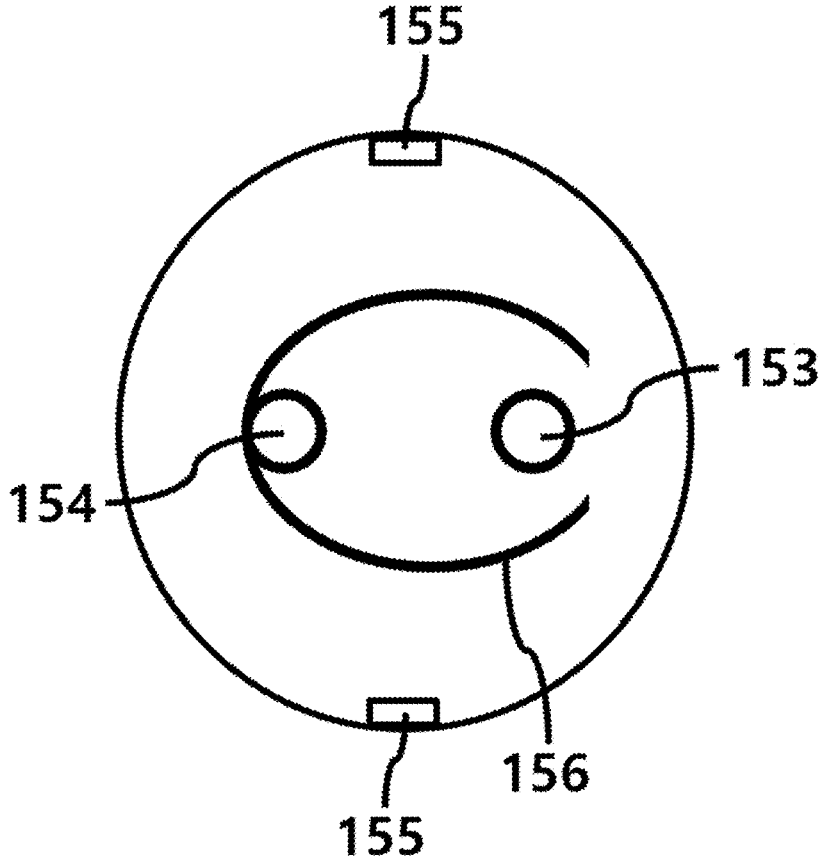
FIG. 6 is a view illustrating an example configuration of a neutral line terminal area expansion unit implemented in the form of a metal body having an open surface, which is in contact with the neutral line terminal and not in contact with the phase voltage line terminal.

FIG. 5 is a view illustrating an example configuration of a neutral line terminal area expansion unit implemented in the form of a metal body having an eccentric closed surface, which is inscribed with the neutral line terminal and spaced apart from the phase voltage line terminal; and FIG. 6 is a view illustrating an example configuration of a neutral line terminal area expansion unit implemented in the form of a metal body having an open surface, which is in contact with the neutral line terminal and not in contact with the phase voltage line terminal.

The neutral line terminal area expansion unit 156 made of a conductive material is in electrical contact with the neutral line terminal 154 to expand an area of the neutral line terminal 154 so as to limit a leakage current. In this case, the neutral line terminal area expansion unit 156 may be implemented in the form of a metal body having an eccentric closed surface, which is inscribed with the neutral line terminal 154 and spaced apart from the phase voltage line terminal 153.

Unlike this, the neutral line terminal area expansion unit 156 may be implemented in the form of a metal body having an open surface, which is in contact with the neutral line terminal 154 and not in contact with from the phase voltage line terminal 153.

The area of the neutral line terminal 154 becomes greater than the phase voltage line terminal 153 and the ground terminal 150 due to the neutral line terminal area expansion unit 156, and thus the leakage current becomes very small. As the leakage current becomes smaller, the risk of electric shock deceases, and thus the risk of electric shock to the human body due to the leakage current can be minimized.

The reason for this, as disclosed in Korean Patent Registration No. 10-1625493 (published on May 30, 2016), is that the leakage current gradually decreases as the area of the flat plate-shaped conductor (corresponding to the neutral line terminal of the present disclosure) connected to a negative terminal becomes greater than an area of the flat plate-shaped conductor (corresponding to the phase voltage line terminal of the present disclosure) connected to a positive terminal of a power source.

In detail, a closed loop is not normally configured in a portion of the neutral line terminal 154 where an area is expanded by the neutral line terminal area expansion unit 156, but when the electrical outlet 150 of the movable distribution board 100 having a leakage current limiting function is submerged in water due to flooding, the closed loop is configured.

When the electrical outlet 150 of the movable distribution board 100 having a leakage current limiting function is flooded and submerged in water to form the closed loop, the current leaks through the phase voltage line terminal 153, and the current flows through the phase voltage line terminal 153, the water, the neutral line terminal area expansion unit 156, and the neutral line terminal 154 in this order.

In this process, the current leaking from the phase voltage line terminal 153 does not flow to the human body having a relatively very high resistance but flows to the neutral line terminal area expansion unit 156 through the water and is drawn in the neutral line terminal 154. Thus, the leakage current is prevented from flowing to the human body to minimize the risk of electric shock to the human body.

By this implementation, according to the present disclosure, the movable distribution board is implemented in a mobile manner so that the movable distribution board may be used in various places, the electrical outlet having a leakage current limiting function is provided therein, and thus when the movable distribution board is used in the field, the current leaking from the distribution board may be limited. Accordingly, the risk of electric shock to the human body due to the leakage current can be minimized.

Meanwhile, according to an additional aspect of the present disclosure, the movable distribution board 100 having a leakage current limiting function may further include a door 160. The door 160 is coupled to the front of the movable enclosure 110 to be opened or closed.

In the field, a user performs work using the circuit breaker 130, the terminal block 140, and the electrical outlet 150 fixedly arranged in the inner body 120 made of an insulating material and having a leakage current limiting function in a state in which the door 160 coupled to the front of the movable enclosure 110 is open, and closes the door 160 after use.

Meanwhile, according to an additional aspect of the present disclosure, the movable distribution board 100 having a leakage current limiting function may further include a support leg 170. The support leg 170 is coupled to a lower portion of the movable enclosure 110 and supports the movable enclosure 110 on the ground.

Since the movable enclosure 110 is supported on the ground by the support leg 170, the movable enclosure 110 does not move during the work in the field, and thus work stability can be improved.

As described above, according to the present disclosure, the movable distribution board is implemented in a mobile manner so that the movable distribution board may be used in various places, the circuit breaker, the terminal block, and the electrical outlet having a leakage current limiting function are provided therein to limit the current leaking from the distribution board when the movable distribution board is used in the field, and thus the risk of electric shock to the human body due to the leakage current can be minimized. Thus, the purpose of the present disclosure presented above can be achieved.

According to the present disclosure, a movable distribution board is implemented in a mobile manner so that the movable distribution board can be used in various places, a circuit breaker, a terminal block, and an electrical outlet having a leakage current limiting function are provided therein to limit a current leaking from the distribution board when the movable distribution board is used in the field, and thus the risk of electric shock to the human body due to the leakage current can be minimized.

Various embodiments disclosed in the present specification and the drawings are merely presented as specific examples to help understanding and are not intended to limit the scope of various embodiments of the present disclosure.

Thus, it should be interpreted that the scope of various embodiments of the present disclosure includes all changes or modifications derived based on the technical spirit of various embodiments of the present disclosure in addition to the embodiments described herein.

What is claimed is:

1. A movable distribution board having a leakage current limiting function, the distribution board comprising:

a movable enclosure;

an inner body made of an insulating material, which is mounted inside the movable enclosure;

circuit breakers having a leakage current limiting function, which are fixedly arranged in a specific area of the inner body and block power distributed from a power line to terminal loads; and electrical outlets having a leakage current limiting function, which are fixedly arranged in a specific area of the inner body, into which a plug of an electronic device is inserted and coupled, which supply the power distributed from the power line to the electronic device through the plug, wherein the circuit breaker having a leakage current limiting function includes:

a neutral line input terminal area expansion unit that is in electrical contact with a neutral line input terminal on an input side of the circuit breaker to expand an area of the neutral line input terminal on the input side of the circuit breaker so as to limit a leakage current on the input side of the circuit breaker; and a neutral line output terminal area expansion unit that is in electrical contact with a neutral line output terminal on an output side of the circuit breaker to expand an area of the neutral line output terminal on the output side of the circuit breaker so as to limit a leakage current on the output side of the circuit breaker, wherein the electrical outlet includes:

a phase voltage line terminal to which a phase voltage line (R line or T line or S line) of the power line is connected;

a neutral line terminal to which a neutral line (N line) of the power line is connected;

a ground terminal to which a ground line (G line) is connected; and a neutral line terminal area expansion unit that is in electrical contact with the neutral line terminal to expand an area of the neutral line terminal so as to limit a leakage current, wherein the neutral line terminal area expansion unit is implemented in the form of a metal body having an eccentric closed surface, which is inscribed with the neutral line terminal and spaced apart from the phase voltage line terminal, which is in contact with the neutral line terminal and not in contact with the phase voltage line terminal.

2. The movable distribution board of claim 1, further comprising:

terminal blocks having a leakage current limiting function, which are fixedly arranged in a specific area of the inner body and distribute the power distributed from the power line to the terminal loads, wherein the terminal block includes:

an insulator terminal block body in which a phase voltage line conductor electrode having both ends respectively connected to an input side phase voltage line (R line or T line or S line) and an output side phase voltage line (R line or T line or S line), a neutral line conductor electrode having both ends respectively connected to an input side neutral line (N line) and an output side neutral line (N line), and a ground line conductor electrode having both ends respectively connected to an input side ground line (G line) and an output side ground line (G line) are mounted;

an insulator outer enclosure coupled to surround the insulator terminal block body at upper and lower portions thereof; and a neutral line conductor electrode area expansion unit that is in electrical contact with the neutral line conductor electrode of the insulator terminal block body to expand an area of the neutral line conductor electrode so as to limit a leakage current.

3. The movable distribution board of claim 1, further comprising:

a door coupled to a front of the movable enclosure to be opened or closed.

4. The movable distribution board of claim 3, further comprising:

a support leg coupled to a lower portion of the movable enclosure.

*     *     *     *     *